US011130063B2

(12) United States Patent
Barr

(10) Patent No.: US 11,130,063 B2
(45) Date of Patent: Sep. 28, 2021

(54) GAMING SYSTEM FOR SPORTS-BASED BIOMECHANICAL FEEDBACK

(71) Applicant: Ready 2 Perform Technology LLC, Calabasas, CA (US)

(72) Inventor: Andrew Barr, Calabasas, CA (US)

(73) Assignee: Ready 2 Perform Technology LLC, Calabasas, CA (US)

(*) Notice: Subject to any disclaimer, the term of this patent is extended or adjusted under 35 U.S.C. 154(b) by 0 days.

(21) Appl. No.: 16/780,679

(22) Filed: Feb. 3, 2020

(65) Prior Publication Data
US 2021/0236935 A1  Aug. 5, 2021

(51) Int. Cl.
*A63F 13/65* (2014.01)
*A63F 13/212* (2014.01)

(52) U.S. Cl.
CPC ............ *A63F 13/65* (2014.09); *A63F 13/212* (2014.09); *A63F 2300/8005* (2013.01)

(58) Field of Classification Search
CPC . A63F 2300/8005; A63F 13/212; A63F 13/65
See application file for complete search history.

(56) References Cited

U.S. PATENT DOCUMENTS

| | | | |
|---|---|---|---|
| 9,084,933 B1* | 7/2015 | Pope | A63F 13/213 |
| 2009/0062092 A1* | 3/2009 | Mortimer | A63B 26/003 |
| | | | 482/142 |
| 2010/0240458 A1* | 9/2010 | Gaiba | G06F 3/015 |
| | | | 463/36 |
| 2011/0131005 A1* | 6/2011 | Ueshima | A63B 24/0087 |
| | | | 702/141 |
| 2013/0032634 A1* | 2/2013 | McKirdy | G16H 20/30 |
| | | | 235/375 |
| 2013/0222565 A1* | 8/2013 | Guerin | G06F 3/0346 |
| | | | 348/77 |
| 2015/0019135 A1* | 1/2015 | Kacyvenski | G09B 19/0038 |
| | | | 702/19 |
| 2015/0133206 A1* | 5/2015 | Sarrafzadeh | A63F 13/57 |
| | | | 463/7 |
| 2017/0103452 A1* | 4/2017 | Hertel | G06Q 20/047 |
| 2017/0304705 A1* | 10/2017 | Hermandorfer | A63B 63/06 |
| 2017/0357327 A1* | 12/2017 | Dimitrov | G06F 3/011 |

(Continued)

*Primary Examiner* — Malina D. Blaise
(74) *Attorney, Agent, or Firm* — Patent Ingenuity, P.C.; Samuel K. Simpson

(57) ABSTRACT

A gaming system has one or more biomechanical detection units that detect one or more user biomechanical movements of a real-world user. Furthermore, the gaming system has a processor that is programmed to invoke a game engine to generate a virtual game environment. The game engine also determines a real-world athlete having one or more characteristic biomechanical movements. Furthermore, the game engine generates a virtual avatar corresponding to the real-world user. The game engine also presents one or more virtual stimuli in the virtual game environment to the real-world user. Additionally, the game engine determines if the one or more user biomechanical movements in reaction to the one or more virtual stimuli correspond to the one or more characteristic biomechanical movements within a predetermined tolerance threshold, and generate a virtual game acknowledgement based upon the determination that the predetermined tolerance threshold is met.

18 Claims, 19 Drawing Sheets

(56) References Cited

U.S. PATENT DOCUMENTS

2018/0161626 A1* 6/2018 Fung ..................... G16H 50/30
2018/0226146 A1* 8/2018 Aragones ............... G16H 20/30
2019/0012792 A1* 1/2019 Peri ........................ G06F 3/011
2019/0176043 A1* 6/2019 Gosine ................... A63F 13/212

* cited by examiner

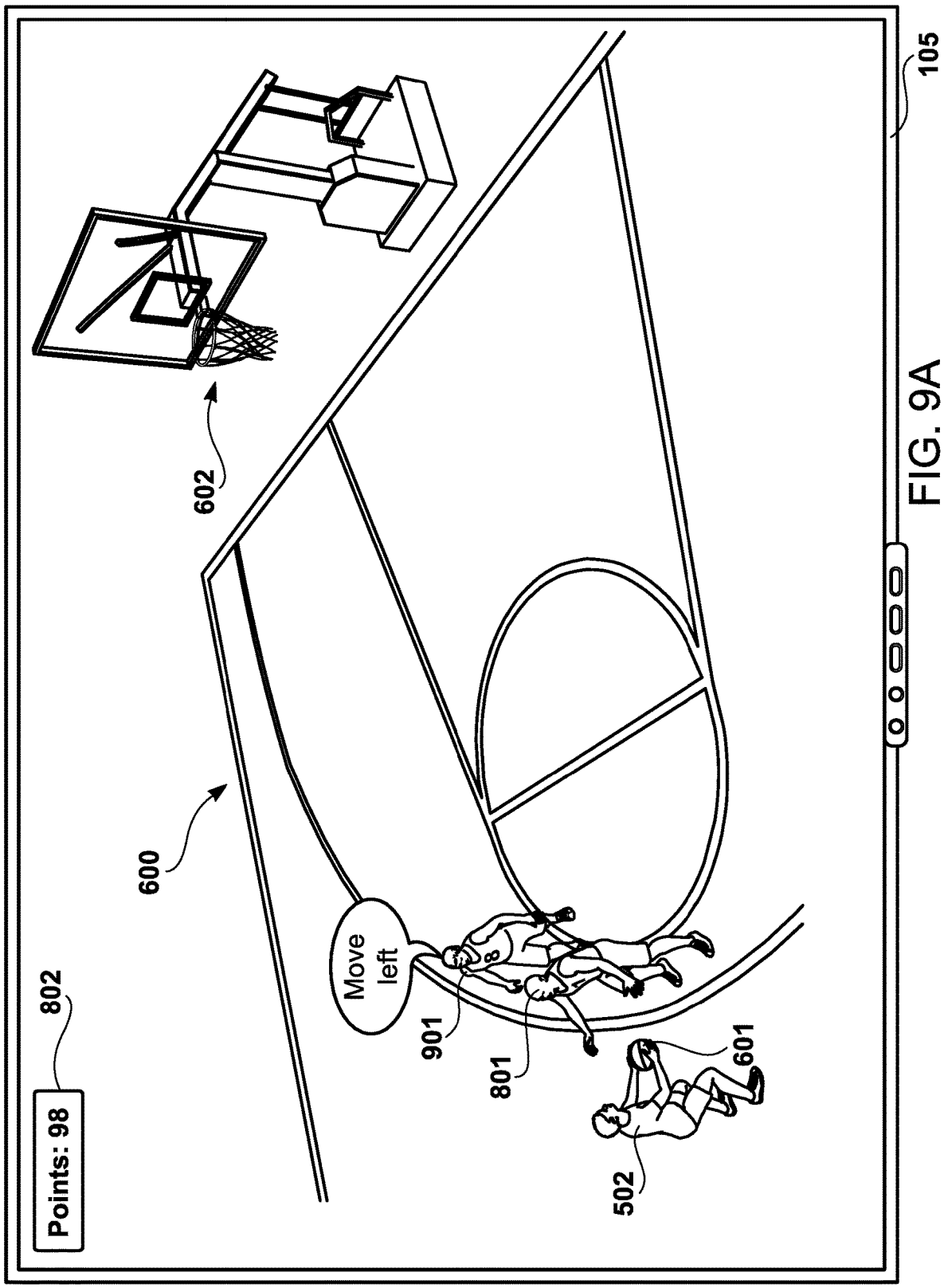

GAMING SYSTEM FOR SPORTS-BASED BIOMECHANICAL FEEDBACK

BACKGROUND

1. Field

This disclosure generally relates to computing systems. More particularly, the disclosure relates to the field of gaming systems.

2. General Background

Recent advances in gaming systems have allowed users in multi-player gaming environments to participate in virtual sports-based environments (e.g., basketball, football, baseball, etc.) from the comfort of a chair. For example, eSports leagues have allowed users in relatively stationary positions, with the exception of movements to operate game controllers, to participate in a competitive sports-based team environment.

Although eSports leagues have allowed users to enjoy the excitement of competition and the comradery of team collaboration, they lack the physical stimulus that is often necessary for the health of the participants. In other words, most conventional gaming systems do little in the form of encouraging physical exercise. As a result, conventional gaming systems do not adequately provide participants with an adequate amount of exercise on a daily basis.

SUMMARY

In one embodiment, a gaming system has one or more biomechanical detection units that detect one or more user biomechanical movements of a real-world user. Furthermore, the gaming system has a processor that is programmed to invoke a game engine to generate a virtual game environment. The game engine also determines a real-world athlete having one or more characteristic biomechanical movements. Furthermore, the game engine generates a virtual avatar corresponding to the real-world user. The game engine also presents one or more virtual stimuli in the virtual game environment to the real-world user. Additionally, the game engine determines if the one or more user biomechanical movements in reaction to the one or more virtual stimuli correspond to the one or more characteristic biomechanical movements within a predetermined tolerance threshold, and generate a virtual game acknowledgement based upon the determination that the predetermined tolerance threshold is met.

As an alternative, a computer program may have a computer readable storage device with a computer readable program stored thereon that implements the functionality of the aforementioned gaming system.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 9A illustrates a multi-player environment in which the user has to coordinate with a virtual teammate against a virtual opponent.

DETAILED DESCRIPTION

Figure 1:
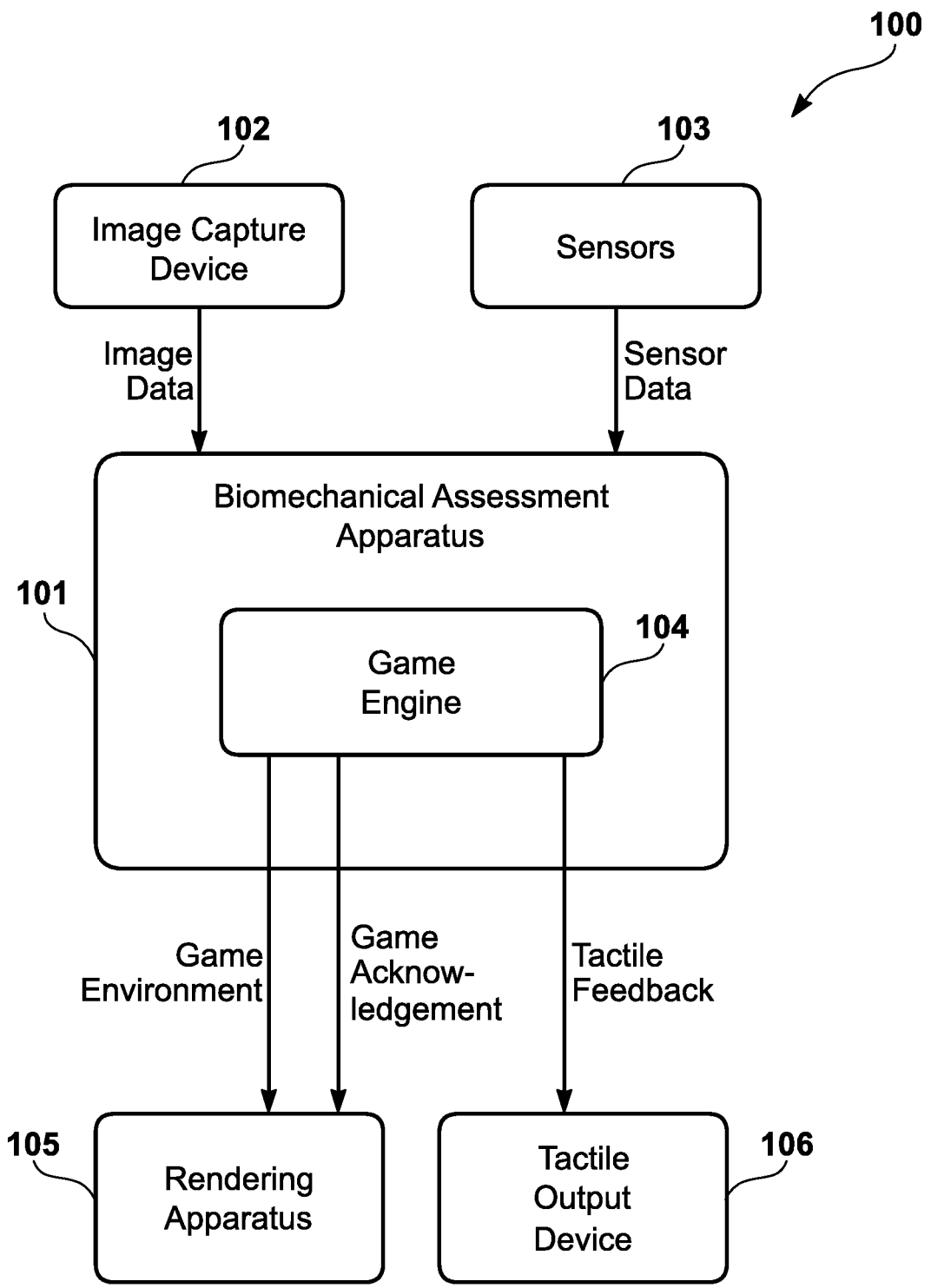
FIG. 1 illustrates a biomechanical game system that may be utilized to provide a gaming experience to a user, potentially within a comfortable environment, such as the home of a user.

A gaming system is provided for sports-based biomechanical feedback. In contrast with previous configurations, the gaming system encourages users to perform athletic, rather than sedentary, activities. In essence, the gaming system allows a user to enjoy a gaming experience, while also obtaining the health benefits of physical exercise.

Furthermore, through a virtual environment, the gaming system allows a user to optimize athletic-based performance and minimize the risk of injury in a real-world environment. For example, the gaming system may provide a virtual basketball game experience that trains the user to perform particular basketball movements applicable to a real-world basketball game. Various virtual stimuli (e.g., virtual coach, virtual opponent(s), and/or virtual teammates) may be presented to the user as part of the virtual game experience. Furthermore, the gaming system may measure, via one or more sensors, the physical, biomechanical reactions of the user to the virtual stimuli. Based on those biomechanical reactions, the gaming system may generate rewards (e.g., points, coupons, products, services, etc.), recommendations (e.g., exercise accessories for purchase, personal training services, etc.), points, etc. Ultimately, the gaming system provides one or more incentives to a user to perform biomechanical movements in a manner that enhances individual training (e.g., drills, sports-specific exercises, etc.), one-on-one training (e.g., sport specific play against a single opponent), and/or simulated team play (e.g., sport specific play as a part of a team playing against another team).

In one embodiment, the gaming system allows the user to select a favorite athlete of the user, and then provides biomechanical feedback to the user so that the user may learn to play a particular sport in a manner that mimics the athlete. In essence, the gaming system may train the user through various interactions to play the sport with the same biomechanical movements as the athlete. The user may then implement those learned movements in a simulated game. In another embodiment, the gaming system may select an optimal set of biomechanical movements for the user based on the particular physical attributes of the user. For example, the gaming system may perform image capture on the user, and perform image analysis to determine physical attributes (e.g., height, limb length, etc.) that match up with an athlete of similar physical attributes.

Furthermore, the gaming system may be an interactive visualization system that generates a visual display of a gaming pipeline, which may range from initial training all the way to simulated gameplay. For example, the user may be positioned within the comfort of his or her own home in front of a display device that is in operable communication with a game controller (e.g., a television in communication with a set-top box or streaming device, a tablet device with a game controller and a display device, a smartphone with a game controller and a display device, etc.). Based on various sensed movements, the gaming system may display the user's movements on the display device in the context of the gaming environment.

Moreover, the game system may be implemented with various componentry (e.g., sensors) that are positioned to allow for increased levels of accuracy in biomechanical assessment, not feasibly possible by humans subjectively monitoring biomechanical movement or conventional equipment that is focused solely on outputting large amounts of data for subsequent analysis. The specific positioning of sensors in the gaming system allows for real-time, or substantially real-time, measurements of specific joints motions and forces, as well as real-time, or substantially real-time, analysis of such motions or forces to determine compliance with one or more biomechanical rules. For instance, the one or more biomechanical rules may be specific to the athlete that the user is attempting to mimic. The gaming system may reward the user for how closely the user mimics the biomechanical movements of the athlete.

FIG. 1 illustrates a biomechanical game system 100 that may be utilized to provide a gaming experience to a user, potentially within a comfortable environment, such as the home of a user. In particular, the biomechanical game system 100 has a biomechanical assessment apparatus 101 with a gaming engine 104 that establishes and operates the gaming experience based upon the biomechanical feedback received from a user performing various physical exercises or movements during simulated game play. For example, the biomechanical assessment apparatus 101 may be a set-top box (e.g., DVD player, streaming device, etc.) situated in the home of a user. The biomechanical assessment apparatus 101 may receive various data pertaining to a user. For example, the biomechanical assessment apparatus 101 may receive image data of the user performing an exercise, or other athletic movement, from one or more image capture devices 102 (e.g., cameras), which may be distinctly positioned within the same physical environment or integrated within the biomechanical assessment apparatus 101. Additionally, or alternatively, the biomechanical assessment apparatus 101 may sense data (e.g., temperature, heart rate, blood pressure, heat, etc.) pertaining to the user via one or more sensors 103 (e.g., biometric sensor, inertial measurement unit, thermometer, etc.). The image capture device 102 may be used to capture large motor movements, whereas the sensors 103 may be utilized to detect more subtle, fine motor movements (e.g., of the pelvis).

Subsequently, the game engine 104 may perform an image analysis (e.g., on a frame-by-frame basis) of the image data and/or sensed data to determine compliance, or lack of compliance, of the user's performance of the particular exercise, or athletic movement with the one or more biomechanical rules. For example, the game engine 104 may compare positions and/or articulations of various anatomical structures of a user (e.g., limbs, joints, spine, etc.) with tolerance thresholds indicated by the biomechanical rules. If one or more anatomical structures are not compliant with the biomechanical rules at any time during the performance of the exercise, or other athletic movement, the game engine 104 may take a corresponding action in the game. For instance, a user may earn a reward (e.g., points, item, etc.) for an athletic movement that complies with the biomechanical rules, but instead receive a recommendation to purchase an accessory to help improve that athletic movement if it does not comply with the biomechanical rules.

In another embodiment, an integrated sensor may be used in place of distinct sensors 103 and image capture devices 102. For example, a depth/heat sensing (e.g., thermal imaging) camera may be utilized to capture imagery to detect heartrate and/or body heat. A user may stand still in front of the depth/heat sensing camera before the assessment is initiated to generate baseline user data. The depth/heat sensing camera detects if the user's resting heartrate, or heartrate variability, has changed before a next session prior to any exercise, or other athletic movement, taking place. For example, an increased resting pulse or reduced pulse variability may indicate signs of fatigue, warranting a break for a period of time. As another example, increased areas of heat in specific joints compared to the baseline data, or data from previous exercise sessions of comparable intensity, may indicate joint inflammation, warranting a different training regimen, which emphasizes uninflamed joints, for that particular training session.

The game engine 104 provide the gaming experience via a rendering apparatus (e.g., television, display monitor, etc.). Furthermore, the game engine 104 may generate one or more game alerts via the rendering apparatus 105 and/or a tactile output device 106 (e.g., haptic vibration unit). For example, a game alert may be a game acknowledgement (e.g., reward, point, etc.) indicating compliance with the biomechanical rules. As another example, the tactile feedback may indicate a lack of compliance with the biomechanical rules.

The biomechanical assessment apparatus 101 may be positioned within the same physical environment as the image capture device 102, sensors 103, rendering apparatus 105, and tactile output device 106 such that the biomechanical assessment apparatus 101 may communicate in a localized manner (e.g., wired connection or wireless connection such as WiFi, BLUETOOTH, etc.).

Although the game engine is illustrated as being positioned on the biomechanical assessment apparatus 101, in an alternative embodiment, it is positioned at a remotely located server. In other words, the game engine 104 may be implemented as a cloud-based system.

In yet another embodiment, an artificial intelligence ("AI") system may be utilized to perform the biomechanical assessment, perform game operations, and/or generate game recommendations. For example, the AI system may determine a statistically optimal real-world player for the user to mimic for the user's overall dimensions (e.g., height, limb lengths, etc.). In determining what is statistically optimal, the AI system may analyze which real-world players meet certain performance criteria (e.g., most points scored) and certain safety criteria (e.g., most games played, which is indicative of fewest injuries).

Figure 2:
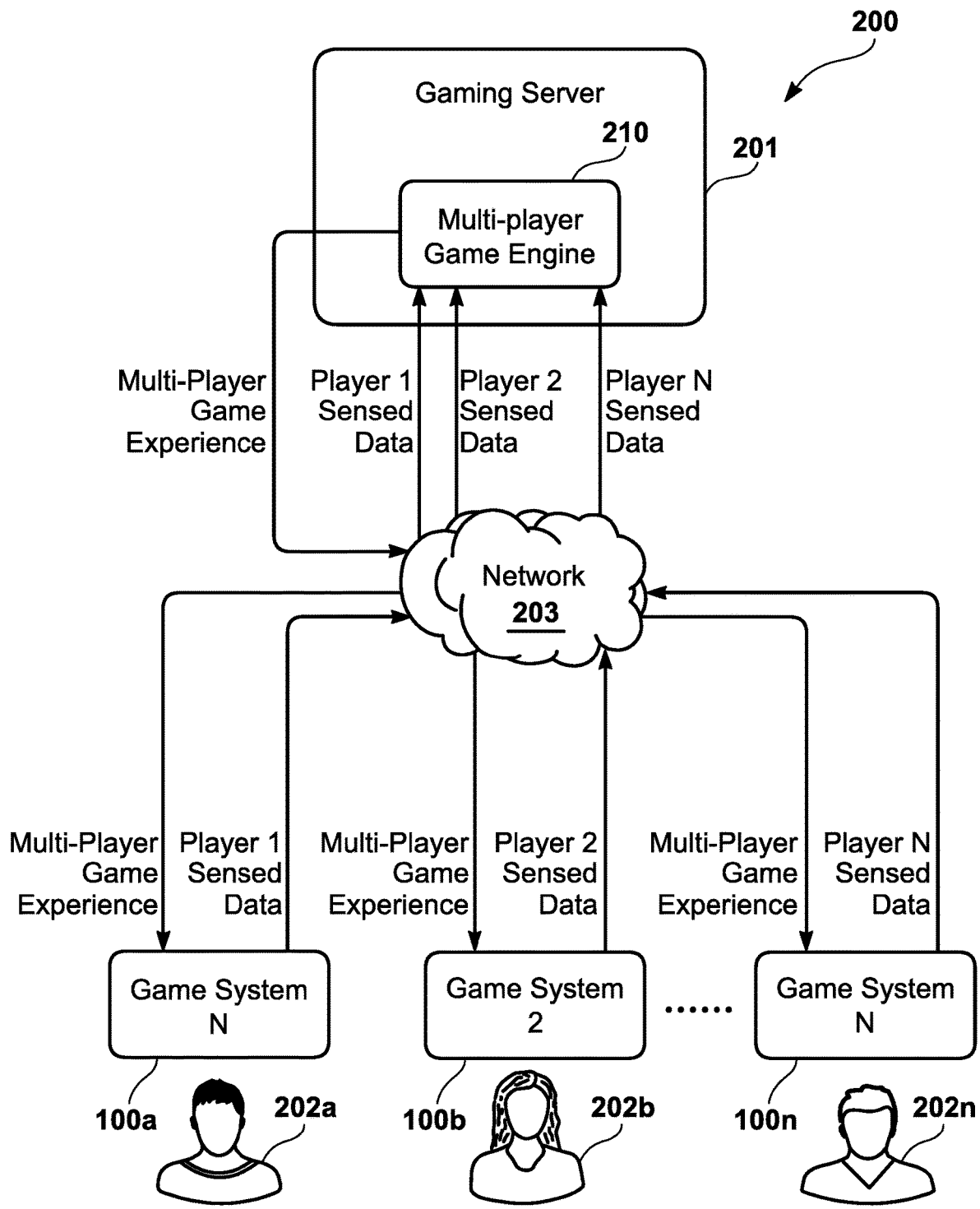
FIG. 2 illustrates a multi-player game configuration.

FIG. 2 illustrates a multi-player game configuration 200. In particular, multiple players 202*a-n* may each have one of the biomechanical game systems 100*a-n*, as illustrated in FIG. 1. Furthermore, the biomechanical game systems 100*a-n* may communicate with a game server 201 via a network 203. In essence, the multi-player game configuration 200 allows a plurality of players 202*a-n* to compete with one another in a simulated sports environment. Furthermore, the plurality of players 202*a-n* may earn rewards based on compliance with biomechanical rules during that simulated game play. As an example, the biomechanical rules may be partially tailored to comport with a team sport environment. For instance, a player may earn a reward not just for performing a biomechanically correct movement, but also for performing that movement in reaction to events during the simulated team play environment; such events may even include a verbal communication between different players 202*a-n* and a biomechanical reaction to that verbal communication within a predetermined period of time. Additionally, the multi-player game configuration 200 may allow for electronic communication between the plurality of players 202*a-n*. The gaming server 201 may use a multi-player game engine 210 to coordinate game operations of the multi-player game environment.

Although FIG. 2 illustrates the multi-player game configuration 200 as being cloud-based, other types of configurations may be used in the alternative. For example, a peer-to-peer configuration may be used instead of a cloud-based system.

Figure 3A:
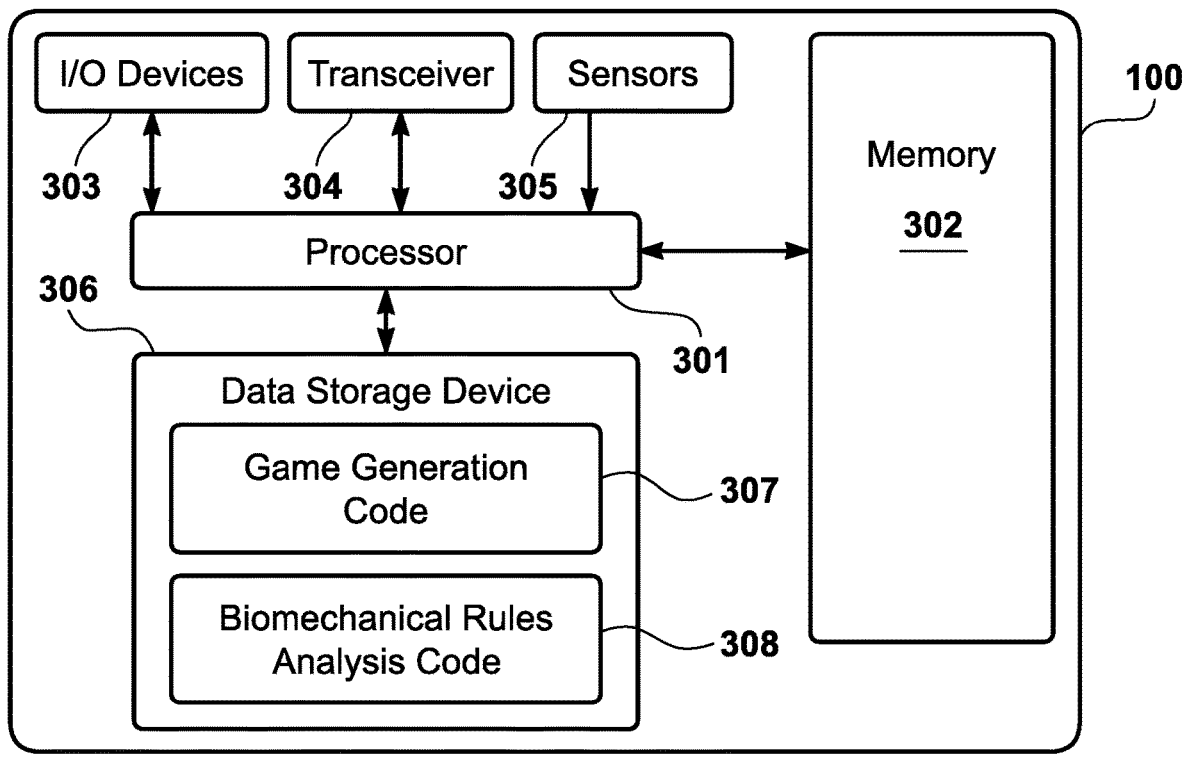
FIG. 3A illustrates a system configuration for the biomechanical game system.
Figure 3B:
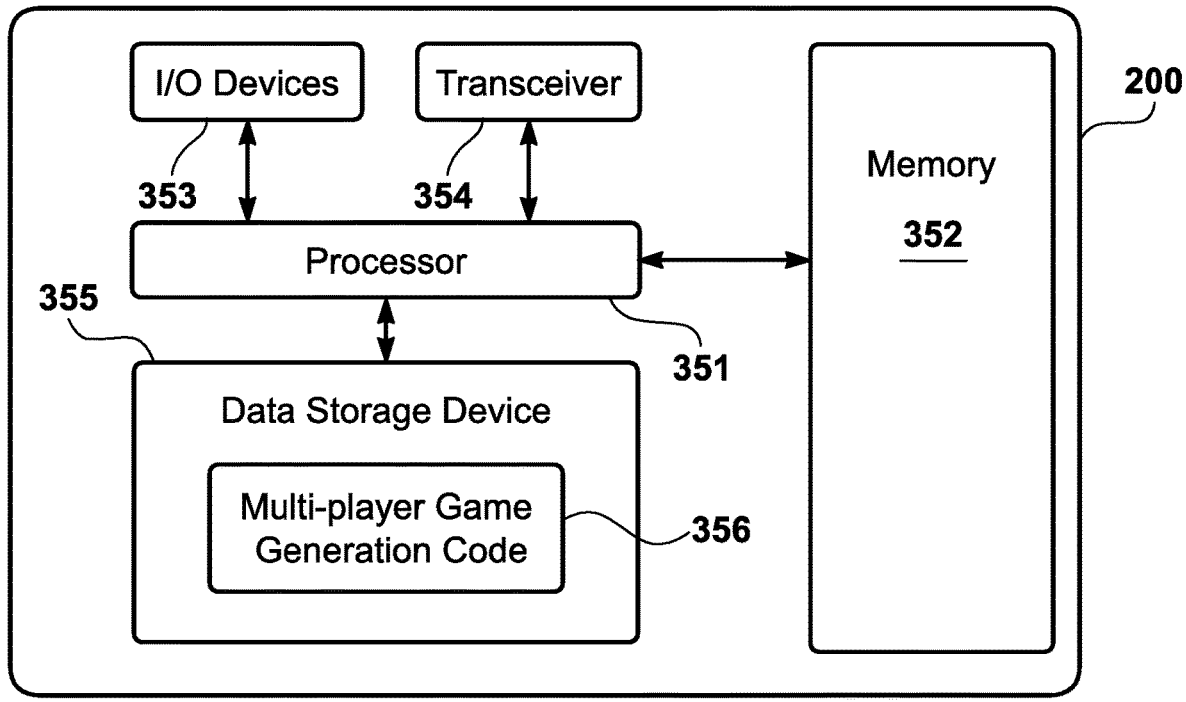
FIG. 3B illustrates a system configuration for the multi-player game configuration.

FIGS. 3A and 3B illustrate system configurations for the various componentry of the biomechanical game system 100 illustrated in FIG. 1 and the multi-player game configuration 200 illustrated in FIG. 2, respectively. In particular, FIG. 3A illustrates a system configuration for the biomechanical game system 100. A processor 301, which may be specialized for game operations may be used to perform the operations illustrated in FIG. 1A for generating and implementing a game experience.

The system configuration may also include a memory device 302, which may temporarily store computer readable instructions performed by the processor 301. As an example of such computer readable instructions, a data storage device 306 within the system configuration may store game generation code 307 and biomechanical rules analysis code 308. The processor 301 may execute the game generation code 307 to gamify the biomechanical assessment experience. In essence, the user is able to obtain the benefits of biomechanical assessment via an enjoyable game experience. Furthermore, the processor 301 may execute the biomechanical rules analysis code 307 to establish the biomechanical rules and determine compliance with the biomechanical rules.

The processor 301 may also receive data from the one or more sensors 103 to determine compliance with the biomechanical rules. (The "sensors 103" are illustrated as being distinct from the image capture device 102 in FIG. 1; however, the image capture device 102 may be considered to be a sensor 103.)

Moreover, the system configuration may have one or more input/output ("I/O") devices 303 that may receive inputs and provide outputs. Various devices (e.g., keyboard, microphone, mouse, pointing device, hand controller, joystick, etc.) may be used for the I/O devices 303. The system configuration may also have a transceiver 304 to send and receive data. Alternatively, a separate transmitter and receiver may be used instead.

By way of contrast, FIG. 3B illustrates a system configuration for the multi-player game configuration 200. In particular, a processor 351, which may be specialized for multi-player game generation, may be used to coordinate and operate the multi-player game experience. The system configuration may also include a memory device 352, which may temporarily store computer readable instructions performed by the processor 351. As an example of such computer readable instructions, a data storage device 355 within the system configuration may store multi-player game generation code 356. Additionally, the system configuration may have one or more input/output ("I/O") devices 353 that may receive inputs and provide outputs. Various devices (e.g., keyboard, microphone, mouse, pointing device, hand controller, joystick, etc.) may be used for the I/O devices 353. The system configuration may also have a transceiver 354 to send and receive data. Alternatively, a separate transmitter and receiver may be used instead.

Figure 4:
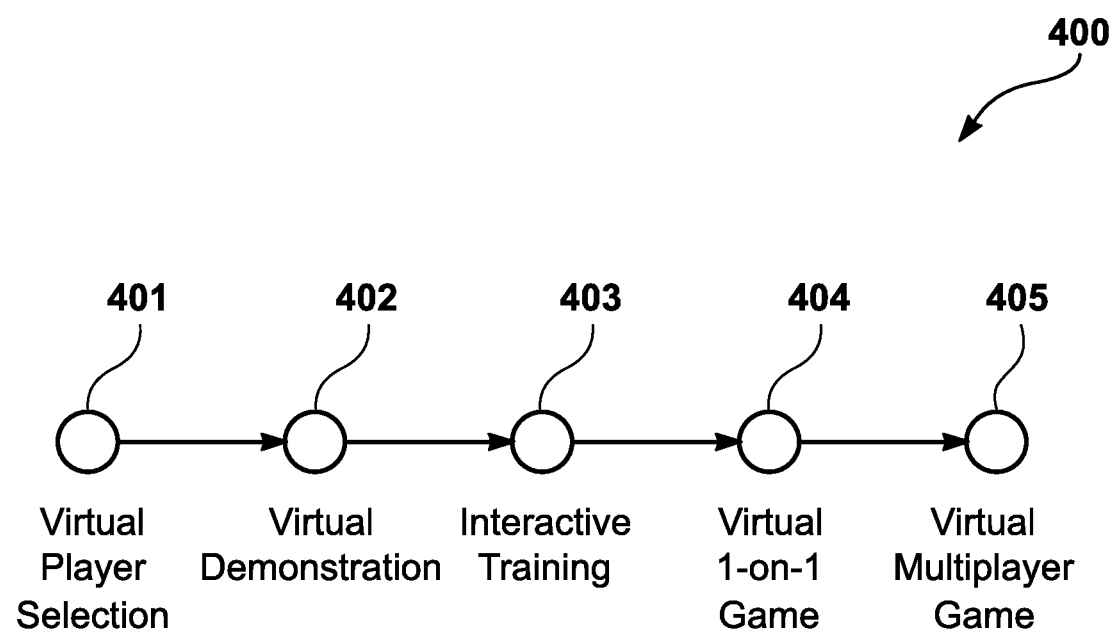
FIG. 4 illustrates a gaming experience pipeline, which may be utilized by the game engine illustrated in FIG. 1 to provide a game experience to a user based on a biomechanical assessment.

FIG. 4 illustrates a gaming experience pipeline 400, which may be utilized by the game engine 104 illustrated in FIG. 1 to provide a game experience to a user based on a biomechanical assessment. As an example, the gaming experience pipeline 400 has a plurality of stages of progression for game play in which a user attempts to match one or more characteristic biomechanical movements of a real-world athlete. At a first stage 401 of the gaming experience pipeline 400, a virtual player is selected to correspond to a real-world athlete; this is the player whose biomechanical movements the user may attempt to mimic during the game experience. Furthermore, at a second stage 402 of the gaming experience pipeline 400, a virtual demonstration may be provided of how that real-world player performs certain characteristic biomechanical movements (e.g., a particular basketball jump shot). By having that virtual demonstration, the user may obtain a better sense as to how to mimic the biomechanical movements of the real-world athlete. Additionally, at a third stage 403 of the gamine experience pipeline 400, the user may receive interactive training to interact with a virtual sports performance expert to learn how to best perform the characteristic biomechanical movements of the real-world athlete. Subsequently, at a fourth stage 404 of the gaming experience pipeline 400, the user may test his or her skills in a virtual one-on-one game against a virtual opponent. For example, the user may attempt to mimic the characteristic biomechanical movements of the real-world athlete against the virtual opponent. Finally, at a fifth stage 405 of the gaming experience pipeline 400, the user may participate in a virtual multi-player game to test the learned biomechanical movements in a team environment.

Although the gaming experience pipeline 400 is illustrated with respect to selecting a virtual player that corresponds to a real-world athlete, alternatively, it may be used without such a selection. The gaming experience pipeline 400 may be implemented to gamify biomechanical movements of the user without simulated mimicking of a real-world athlete.

Figure 5A:
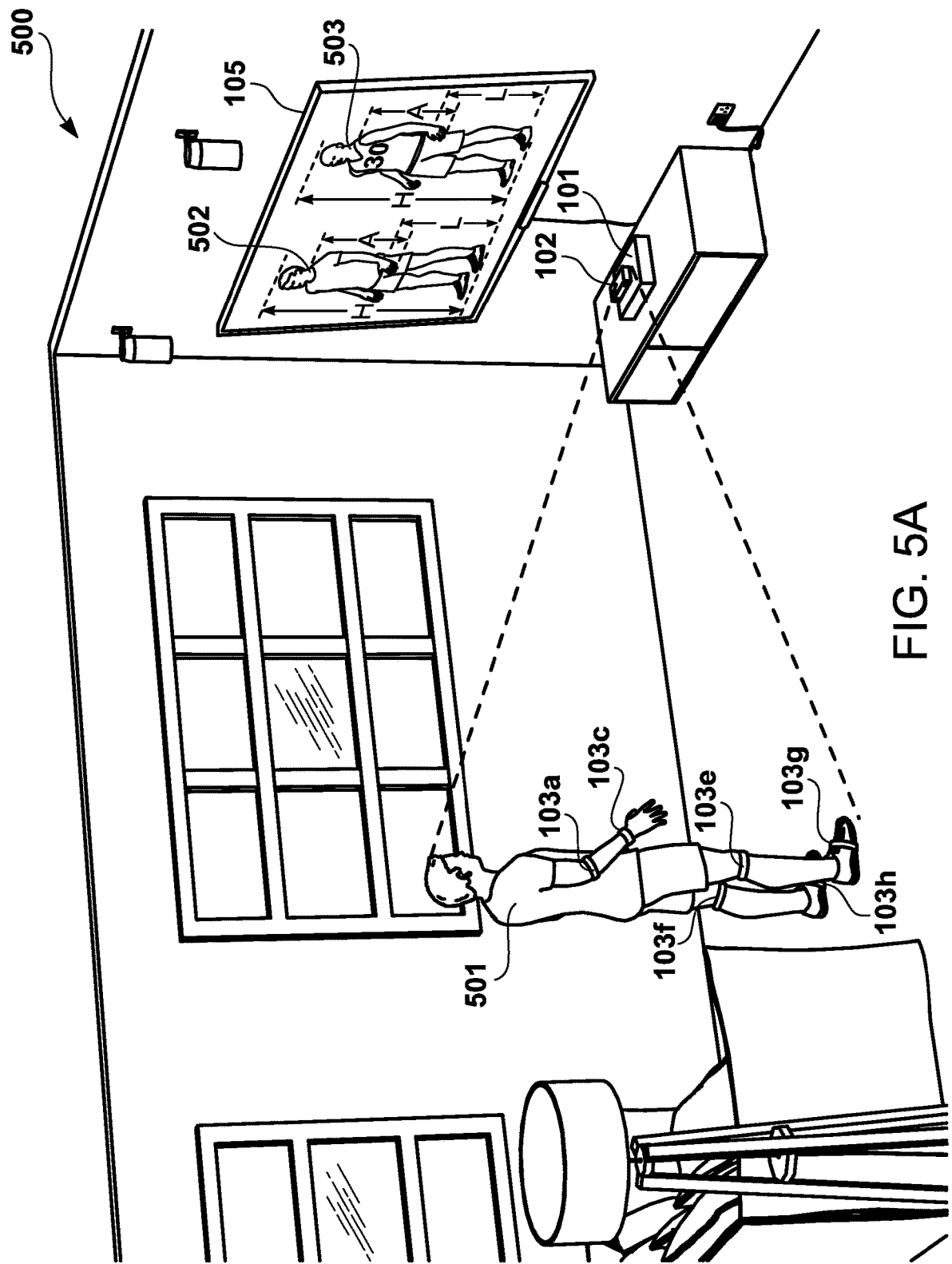
FIG. 5A illustrates an example of the user wearing sensors, which may be used by the biomechanical game apparatus to detect biomechanical movements or other data generate by the user.
Figure 5B:
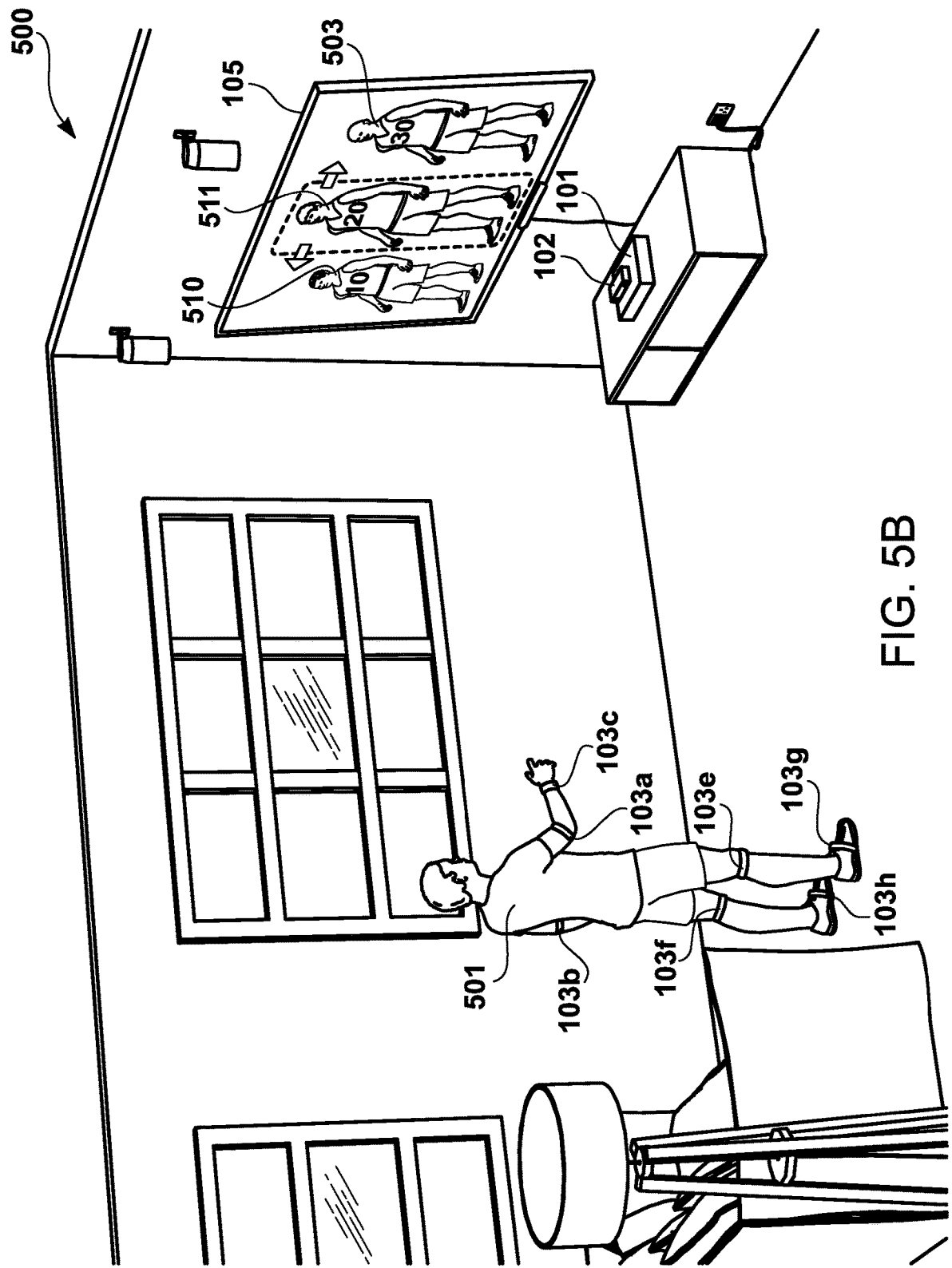
FIG. 5B illustrates the user performing a selection of a corresponding real-world athlete.

FIGS. 5A and 5B illustrate a physical environment 500, such as a living room, in which a user 501 participates in a game experience generated by the game engine 104 of the biomechanical game apparatus 101 illustrated in FIG. 1. In particular, FIG. 5A illustrates an example of the user 501 wearing sensors 103*a-h*, which may be used by the biomechanical game apparatus 101 to detect biomechanical movements or other data generate by the user 501. The biomechanical game apparatus 101 may also be in operable communication with, or have integrated therewith, an image capture device 102. In one embodiment, the biomechanical game apparatus 101 utilizes the image capture device 102 to capture imagery of the user 501, which is then compared by the biomechanical game apparatus 101 to determine potential real-world athletes having similar dimensions (e.g., height, arm length, leg length, etc.). Furthermore, the biomechanical game apparatus 101 may generate imagery on the rendering apparatus 105 to indicate the selection of the corresponding real-world athlete 503, as well as a user avatar 502. For example, an AI system may select the real-world athlete with similar dimensions to that of the user 501. To summarize, the biomechanical game apparatus 101 may perform an image scan of the user, with or without the sensors 103*a-h*, and perform image analysis on that image scan to determine the dimensions of the user 501 to find a real-world athlete with similar dimensions to that of the user. As a result, the user 501 may learn to perform biomechanical movements of a real-world athlete with a similar build to the user 501.

Conversely, FIG. 5B illustrates the user 501 performing a selection (e.g., via a gesture) of a corresponding real-world athlete 503. For example, the user 501 may not want to mimic the movements of a real-world athlete of a similar build, but rather a different build. Accordingly, the user may navigate through a virtual menu with a selection indicium 551 to select a corresponding real-world athlete.

Accordingly, FIGS. 5A and 5B illustrate variations of virtual player selection at the first stage 401 of the gaming experience pipeline 400 illustrated in FIG. 4.

Figure 6A:
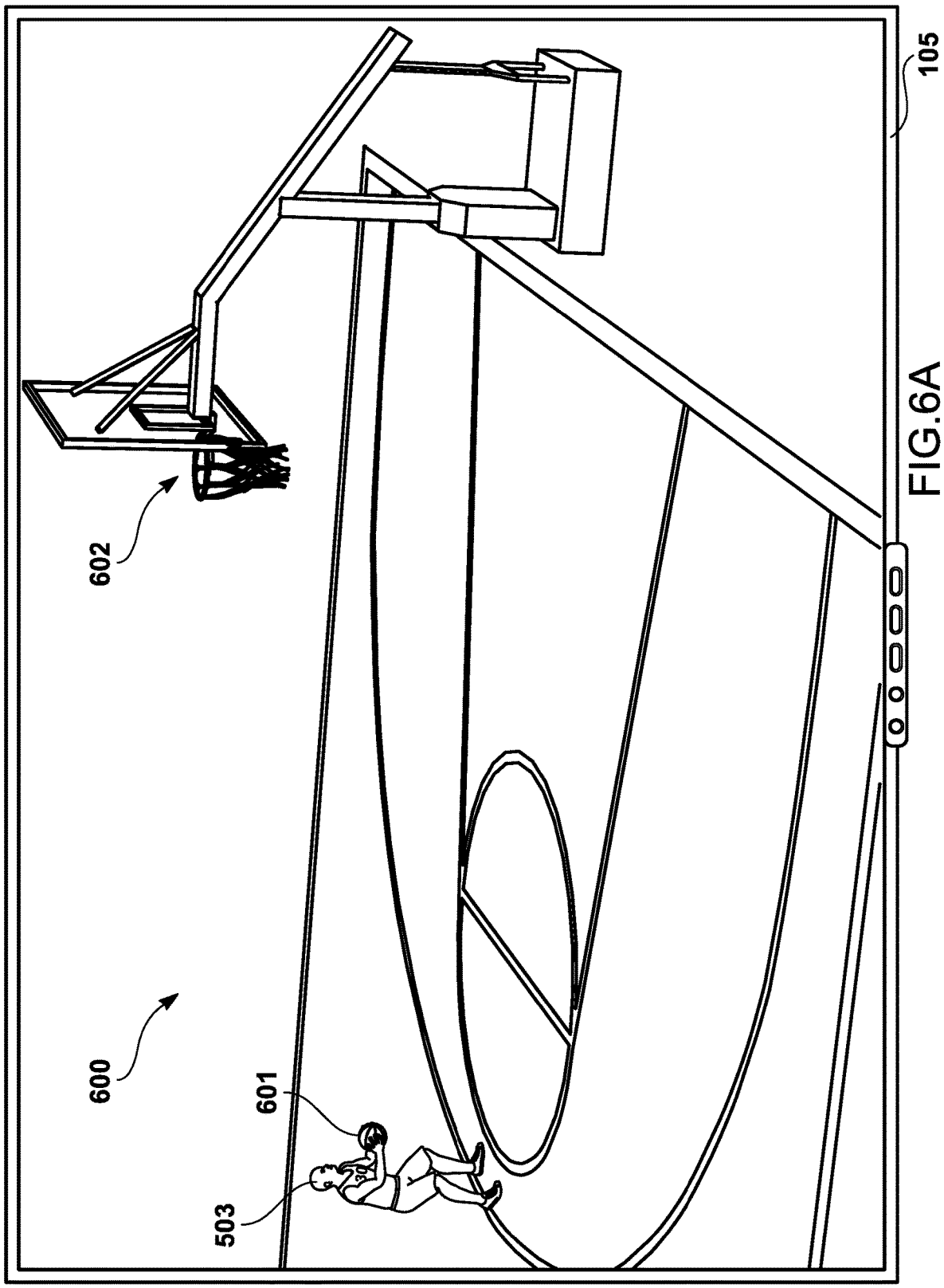
FIG. 6A illustrates an example of the virtual athlete being a basketball player that has one or more characteristic biomechanical movements for initiation of a jump shot, as rendered by the rendering apparatus.
Figure 6B:
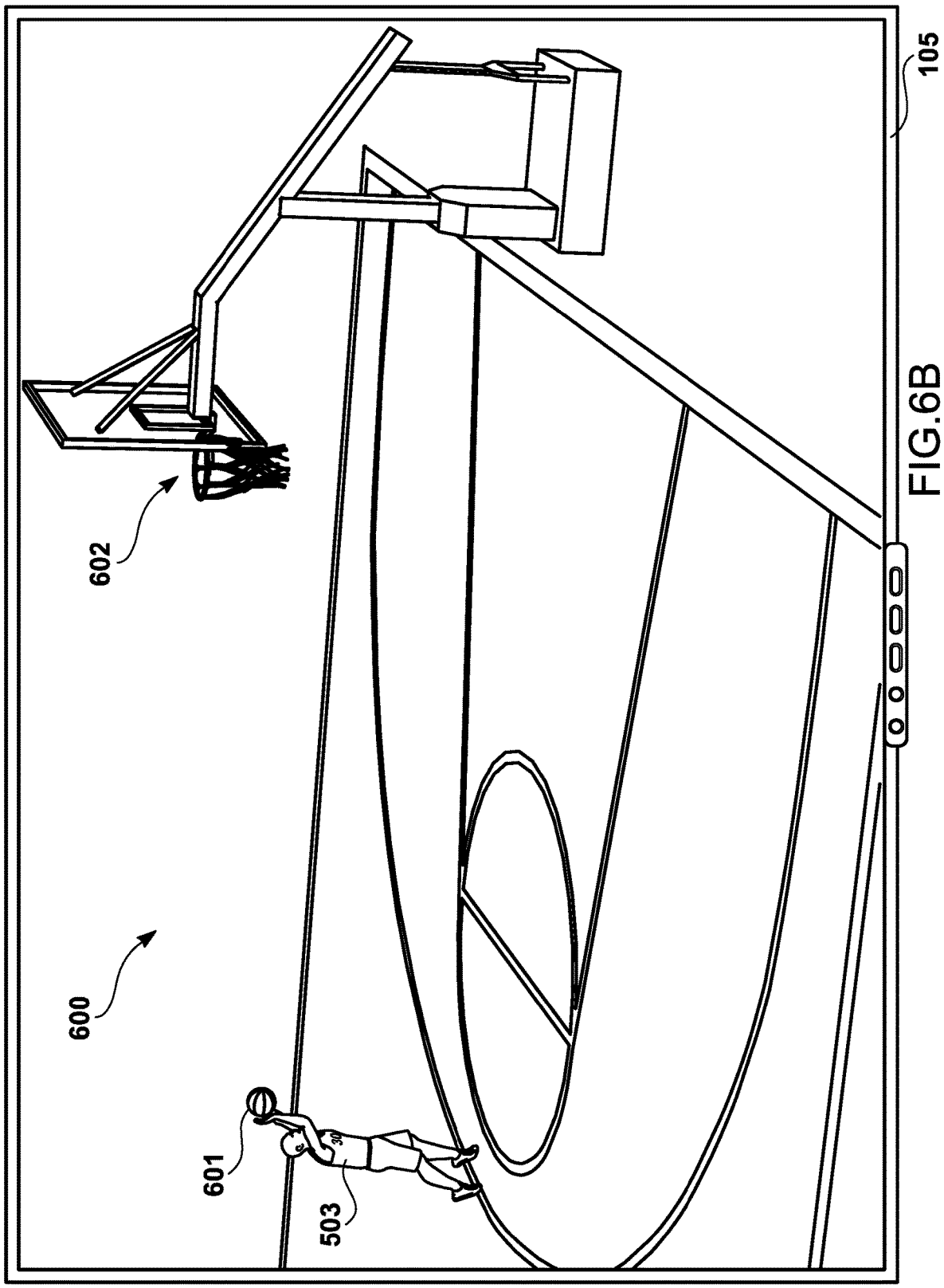
FIG. 6B illustrates the virtual athlete extending his knees and elbows during the jump shot.
Figure 6C:
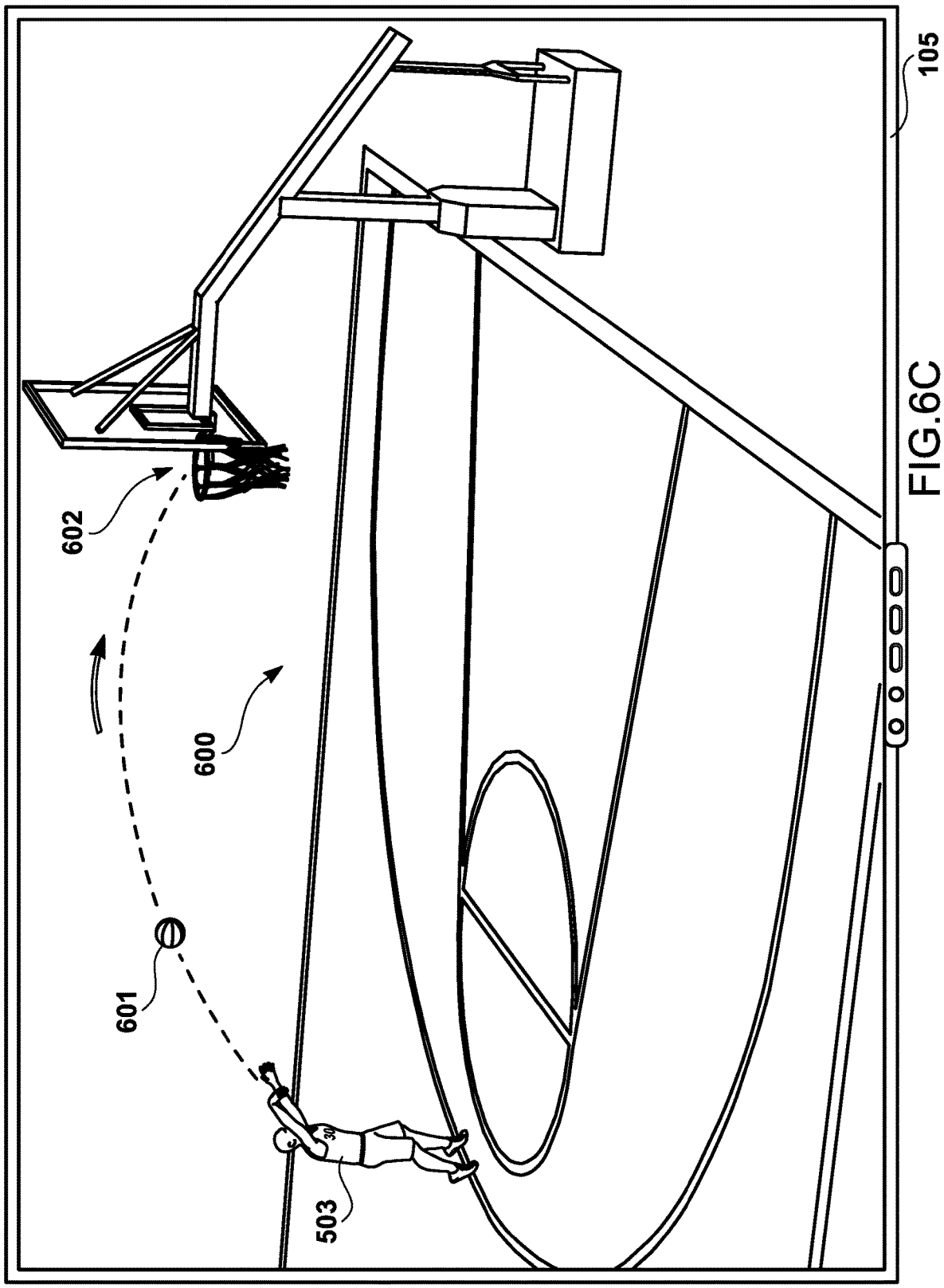
FIG. 6C illustrates the virtual athlete suspended in the air after launching the virtual basketball.
Figure 6D:
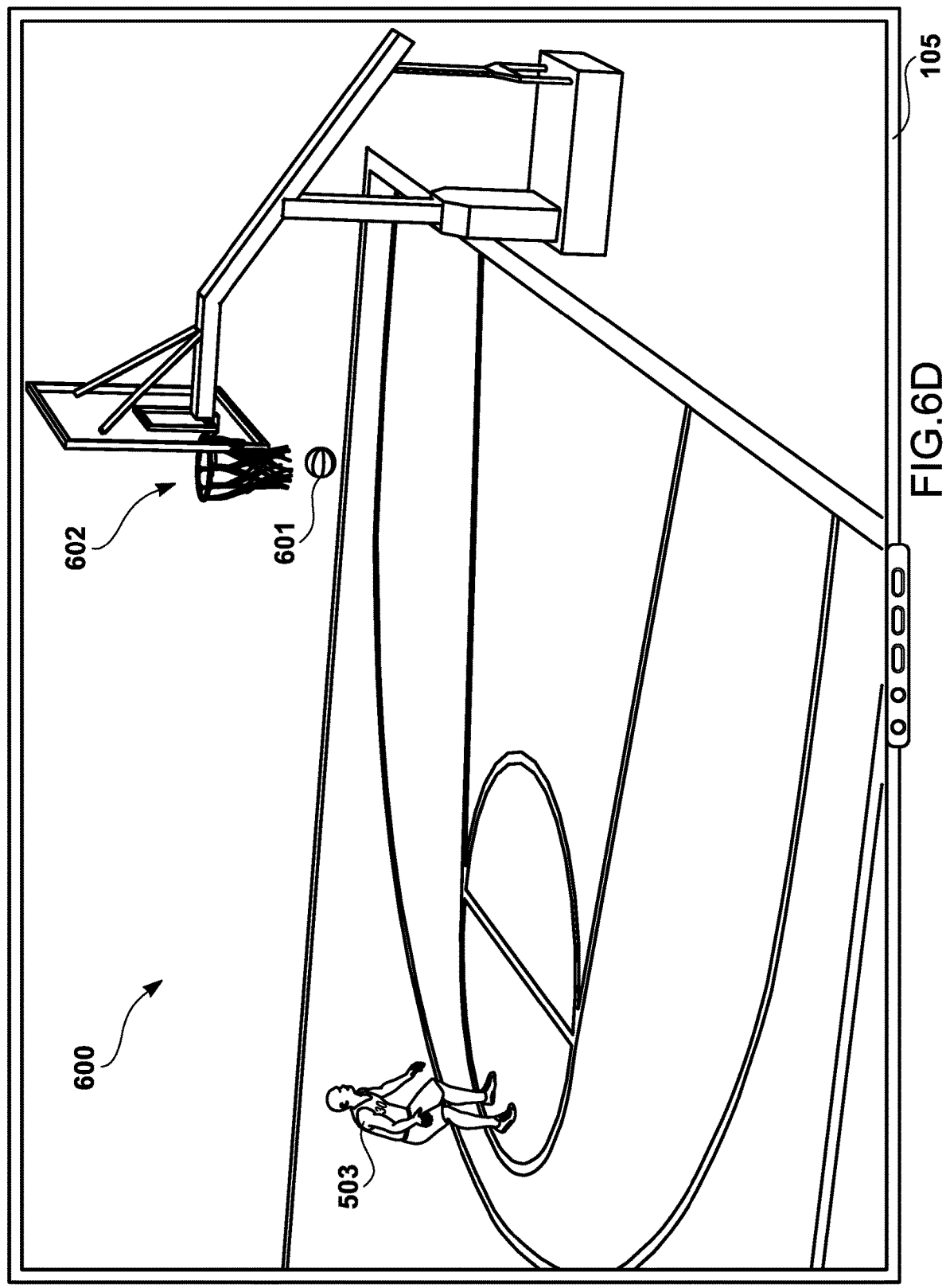
FIG. 6D illustrates the virtual athlete landing after performing the jump shot.

Furthermore, FIGS. 6A-6D illustrate an example of a virtual demonstration of the virtual athlete 503 at the second stage 402 of the gaming experience pipeline 400. In particular, FIG. 6A illustrates an example of the virtual athlete 503 being a basketball player that has one or more characteristic biomechanical movements for initiation of a jump shot (e.g., particular knee flexion and elbow flexion angles during a jump shot), as rendered by the rendering apparatus 105. For example, the user 503 has flexed his knees in preparation for a jump shot to shoot a virtual basketball 601 towards a virtual basketball net 602 on a virtual basketball court 600. FIG. 6B illustrates the virtual athlete 503 extending his knees and elbows during the jump shot. Furthermore, FIG. 6C illustrates the virtual athlete 503 suspended in the air after launching the virtual basketball 601. Finally, FIG. 6D illustrates the virtual athlete 503 landing after performing the jump shot. The biomechanical movements of all of the foregoing actions, even the landing, may be studied by the user 501 to learn how to improve sports performance in a safe manner.

Figure 7A:
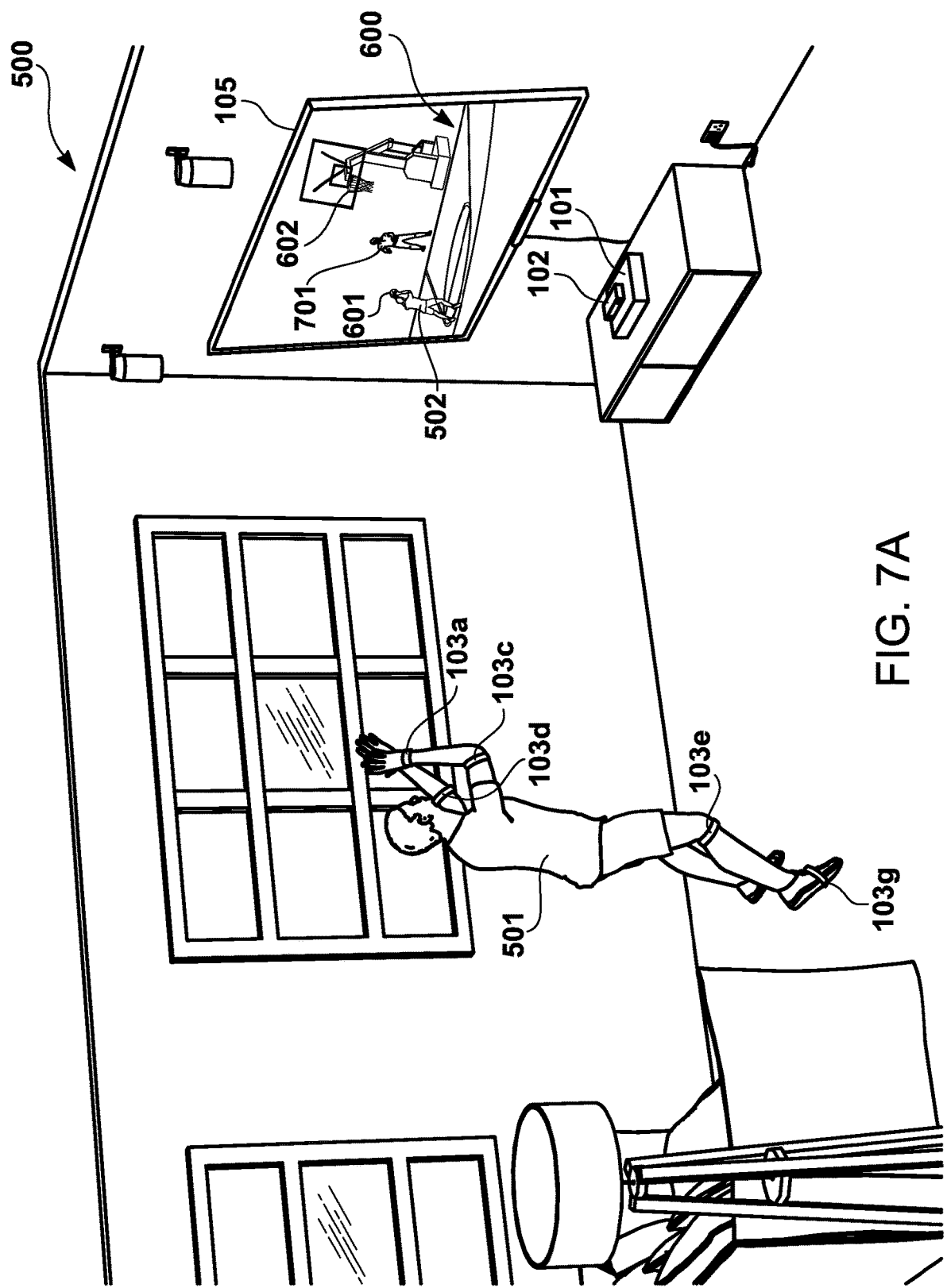
FIG. 7A illustrates an example of the user attempting to initiate performance of a jump shot in the physical environment.
Figure 7B:
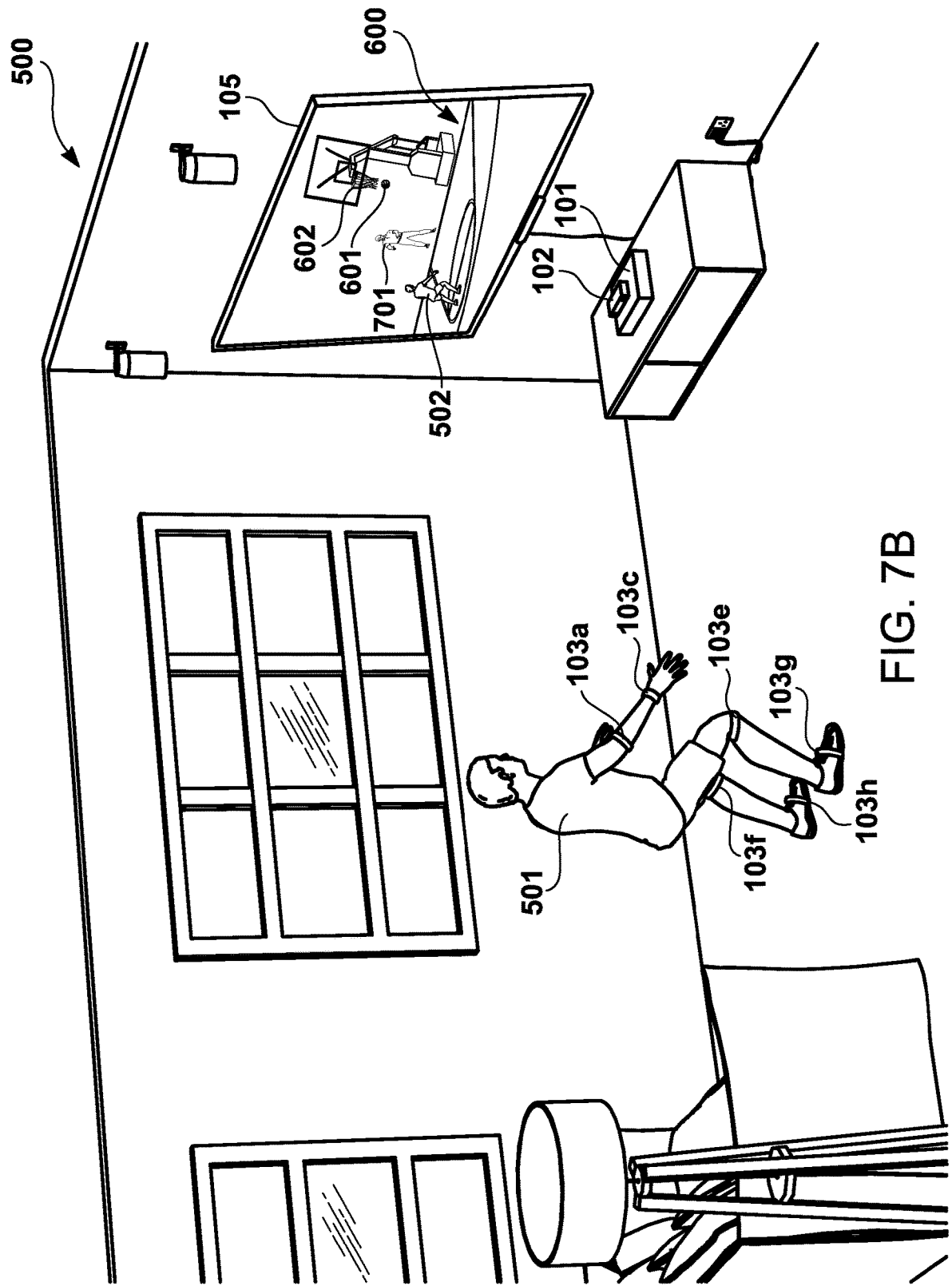
FIG. 7B illustrates an example of the user performing a landing during the jump shot.
Figure 7C:
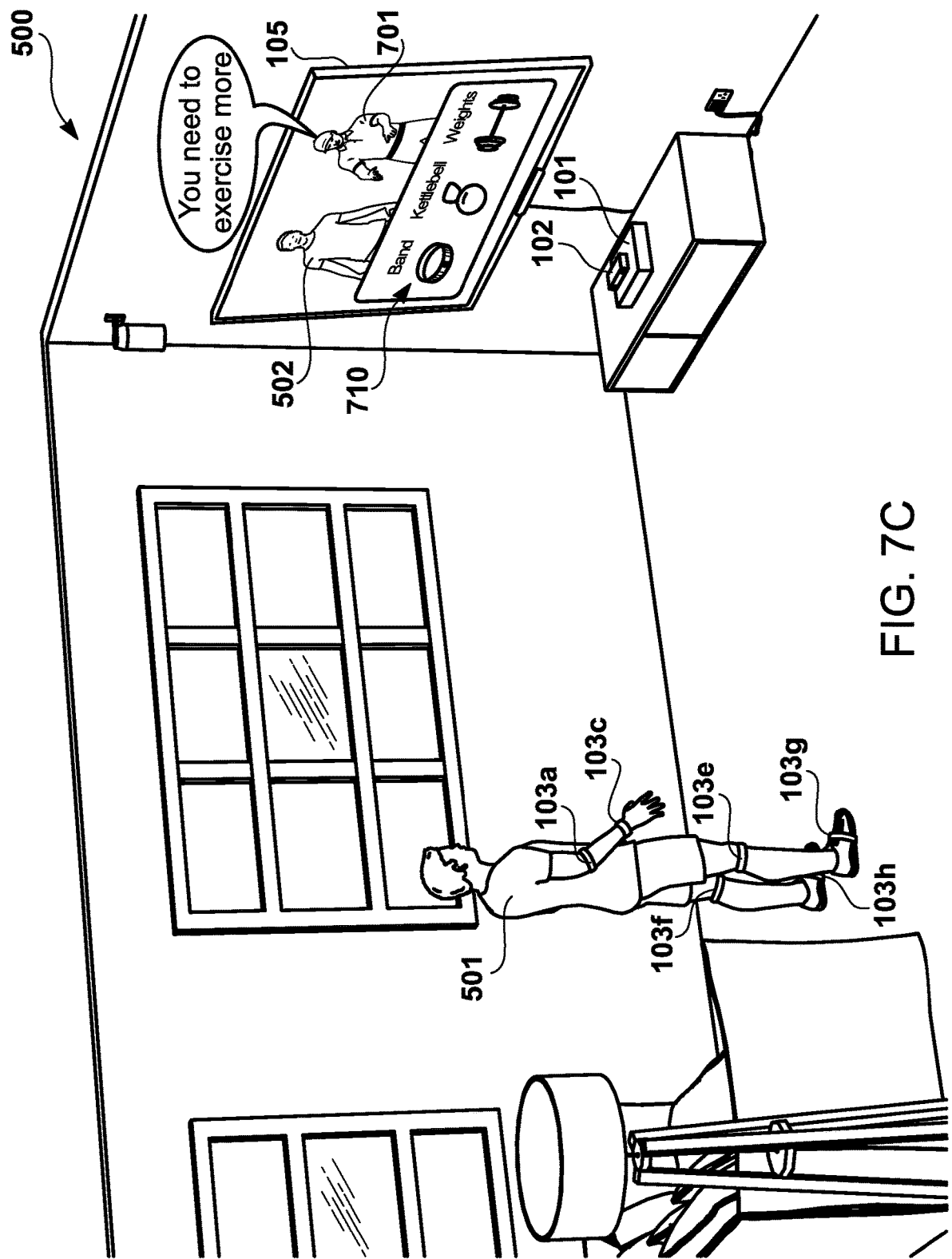
FIG. 7C illustrates the interactive performance expert indicating that the user did not comply with the one or more biomechanical rules subsequent to the landing.

Additionally, FIGS. 7A-7C illustrate the interactive training of the third stage 403 of the gaming experience pipeline 400. After viewing the demonstration of the virtual athlete 503, the user 501 may attempt to mimic the biomechanical movements of the virtual athlete illustrated in FIGS. 6A-6D. Accordingly, FIG. 7A illustrates an example of the user 501 attempting to initiate performance of a jump shot in the physical environment 500. Furthermore, the rendering apparatus 105 may display the user avatar 502 performing the corresponding motion, but within the game environment. Additionally, the rendering apparatus 105 may display a performance expert avatar 701 that may provide interactive coaching to help the user 501 perform correct and safe biomechanical movements. In particular, the performance expert avatar 701 may provide interactive coaching to the user 501 to ensure that the user 501 is comporting with one or more biomechanical rules corresponding to the motions of the real-world athlete. FIG. 7B illustrates an example of the user 501 performing a landing during the jump shot. Finally, subsequent to performing the landing, as illustrated in FIG. 7C, the interactive performance expert 701 may indicate that the user did not comply with the one or more biomechanical rules. The rendering apparatus 105 may display a menu 710, which indicates one or more accessories (e.g., exercises bands, kettlebells, weights, etc.) that the user 501 may purchase to assist with improving the biomechanical movements.

Figure 8A:
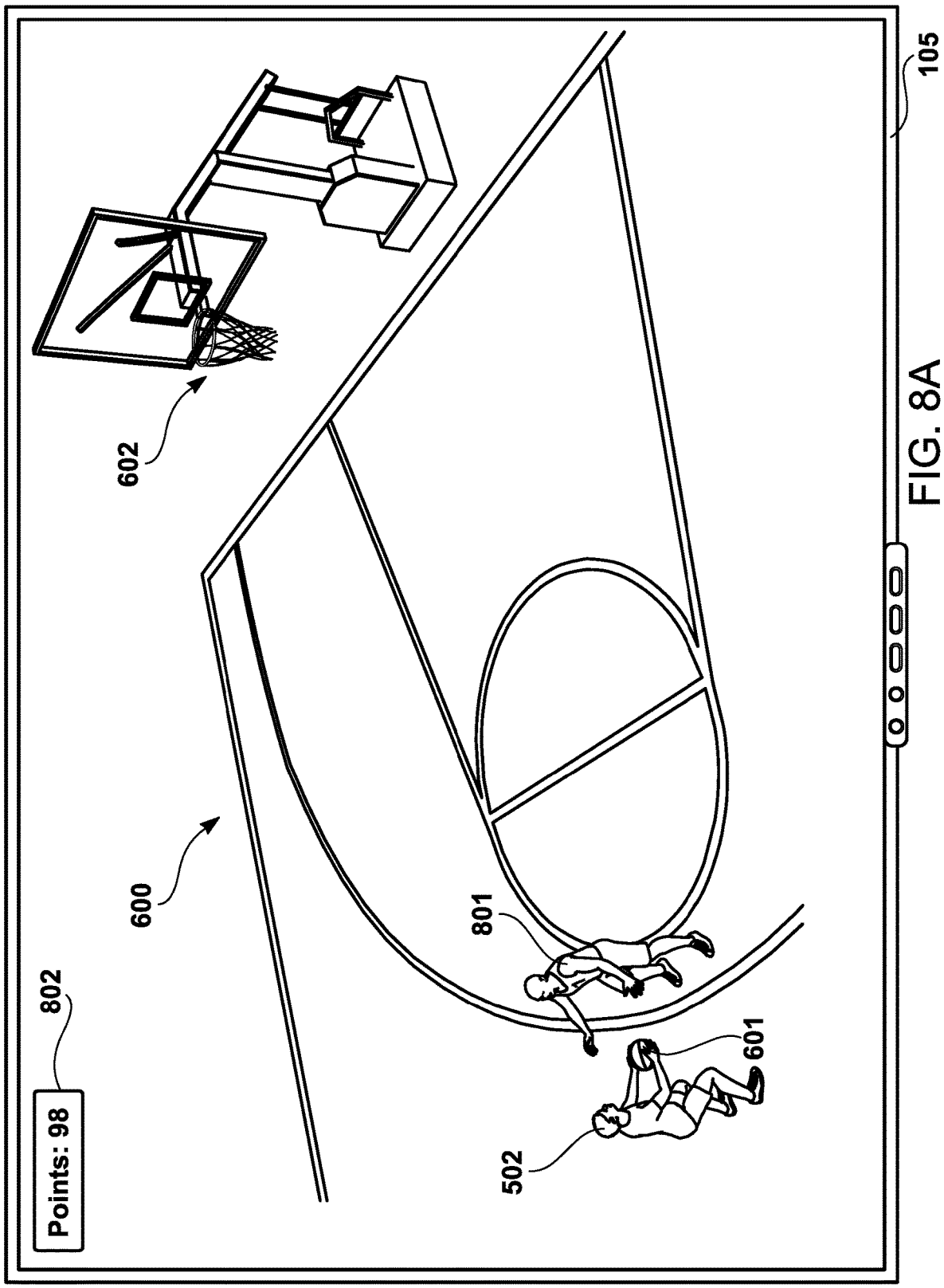
FIG. 8A illustrates a virtual opponent that is rendered by the rendering apparatus to interrupt the jump shot of the user.
Figure 8B:
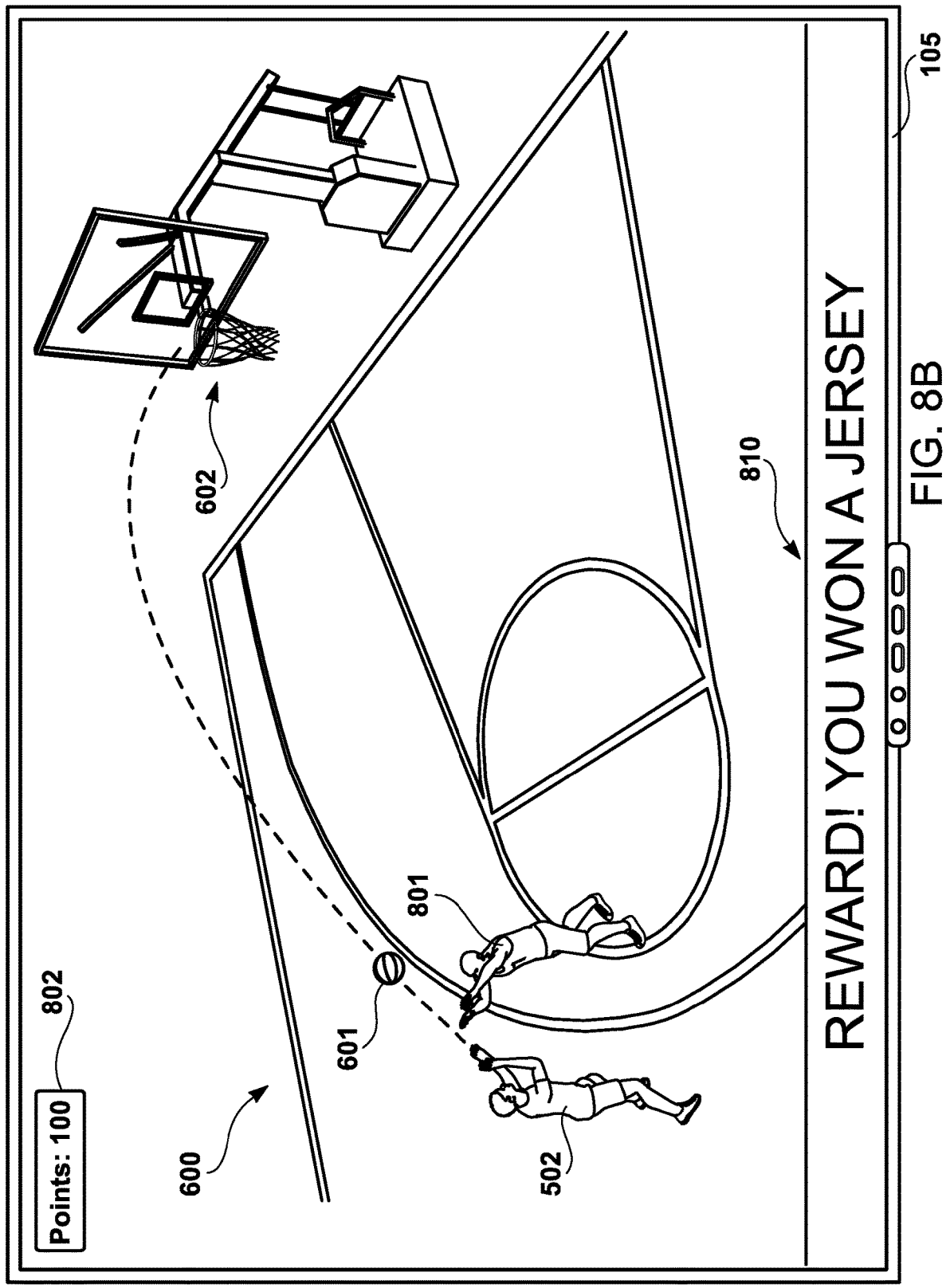
FIG. 8B illustrates the user completing the jump shot.

Additional virtual stimuli may also be provided to the user 501. FIGS. 8A and 8B illustrate the fourth stage 404 of the game experience pipeline 400. In particular, FIG. 8A illustrates a virtual opponent 801 that is rendered by the rendering apparatus 105 to interrupt the jump shot of the user 501. Accordingly, further stress is placed on the biomechanical movements of the user 501. A point indicium 802 (e.g., point box) may be depicted to indicate a current amount of points that the user 501 has in the game. FIG. 8B illustrates the user completing the jump shot. Since the user met the biomechanical requirements (e.g., knee flexion and elbow flexion corresponding within a predetermine tolerance threshold of that of the characteristic movements of a real-world player) during completion of the jump shot, a reward acknowledgement 801 may be visually rendered at the rendering apparatus 105 to indicate winning of a reward (e.g., physical store item, virtual item, points, discount, etc.). Furthermore, the point indicium 802 may be incremented.

Figure 9B:
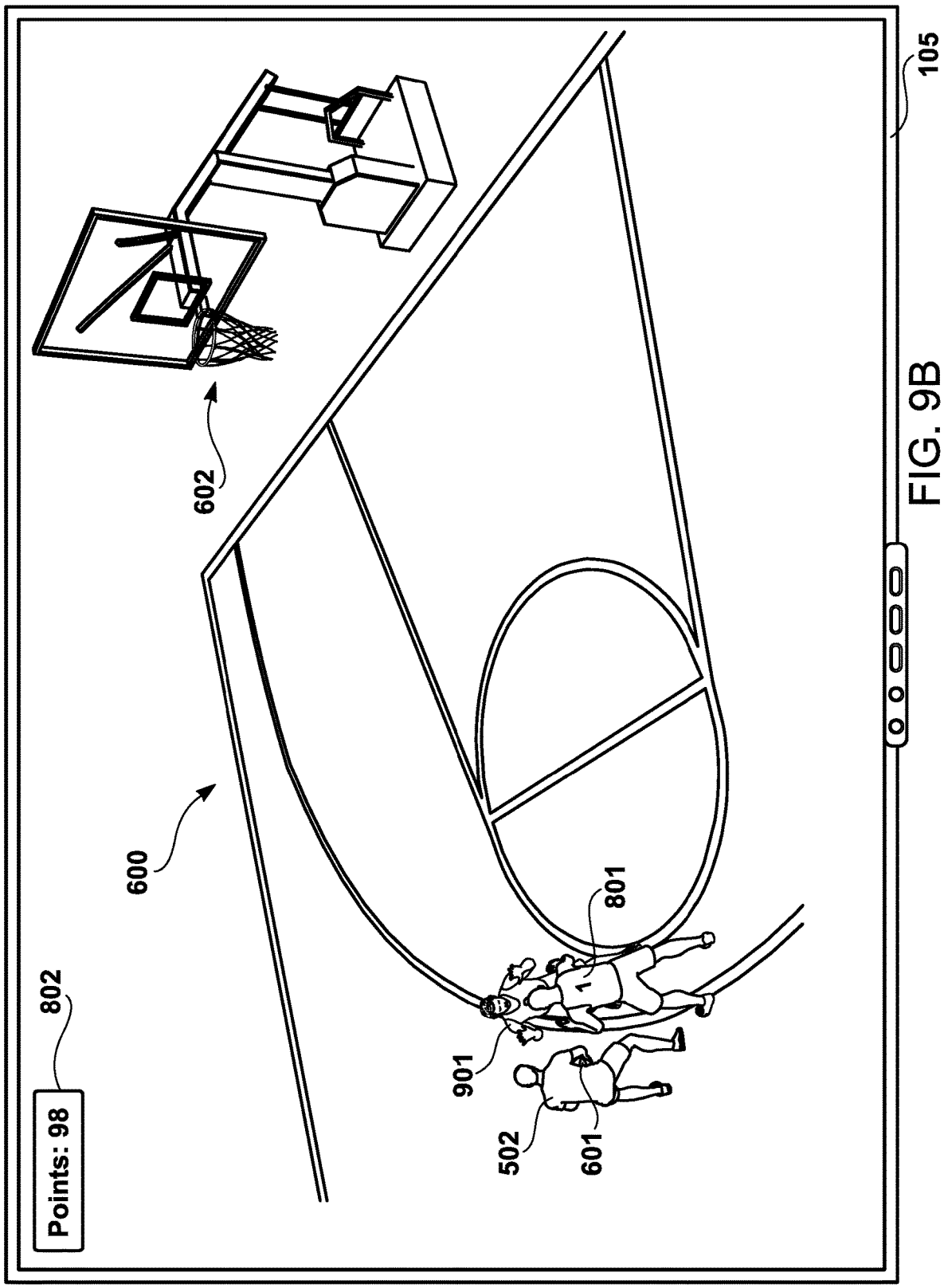
FIG. 9B illustrates the user avatar moving away from the virtual opponent.
Figure 9C:
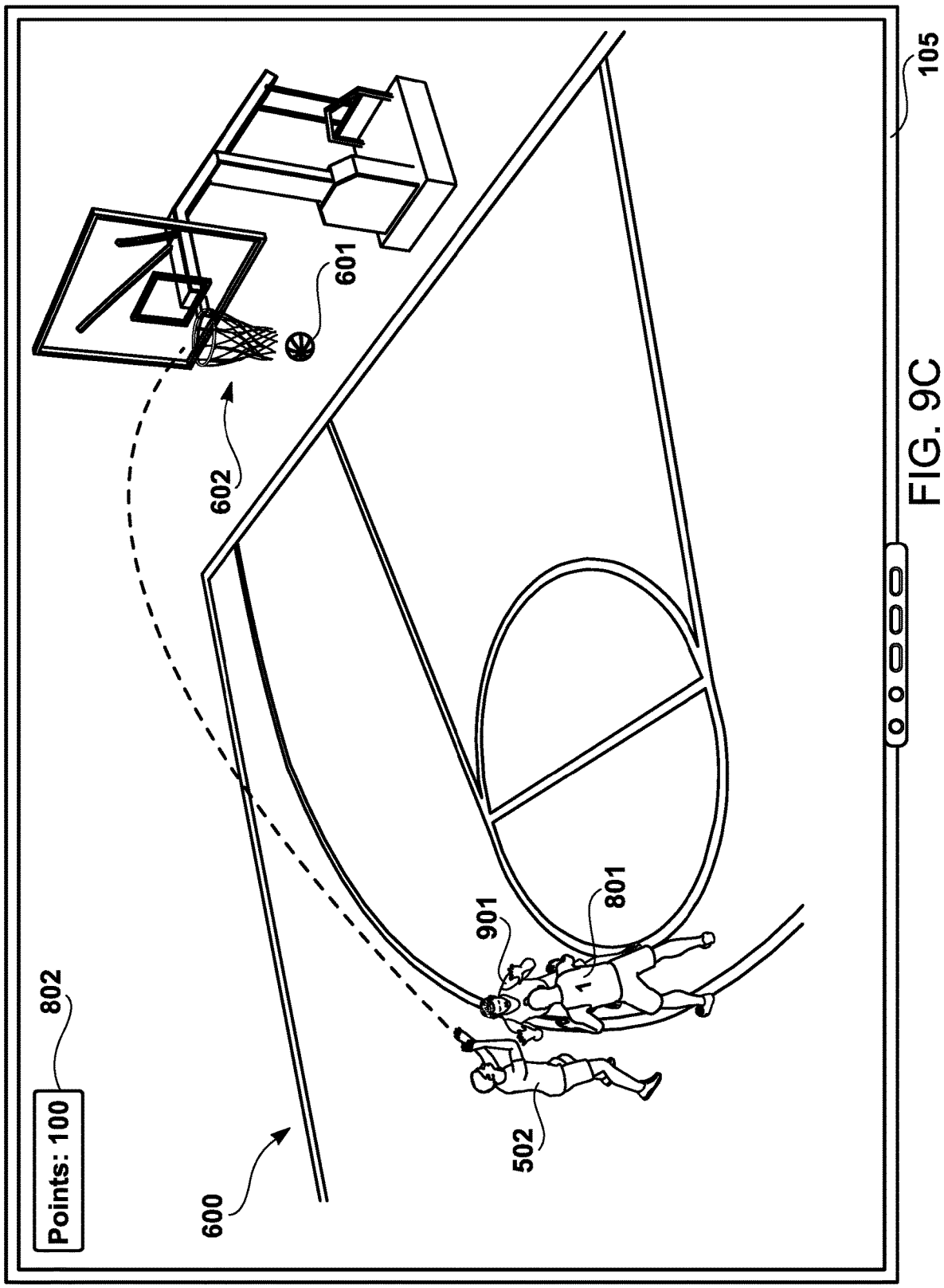
FIG. 9C illustrates the user avatar making the jump shot.

Finally, FIGS. 9A-9C illustrate an example of the fifth stage 405 of the gaming experience pipeline 400. In particular, FIG. 9A illustrates a multi-player environment in which the user 503 has too coordinate with a virtual teammate 901 against a virtual opponent 801. For example, the virtual teammate 901 may call out for a pick-and-roll sequence so that the user avatar 503 is able to initiate and perform a jump shot. FIG. 9B illustrates the user avatar 503 moving away from the virtual opponent. Finally, FIG. 9C illustrates the user avatar 503 making the jump shot. The reward acknowledgement may be based not only on proper biomechanical movements during the jump shot, but also effective biomechanical movements perform in conjunction with the communication with the virtual teammate 901. For example, the user avatar 503 may have to listen to the instruction provided by the virtual teammate 901 within a predetermine time threshold.

Figure 10:
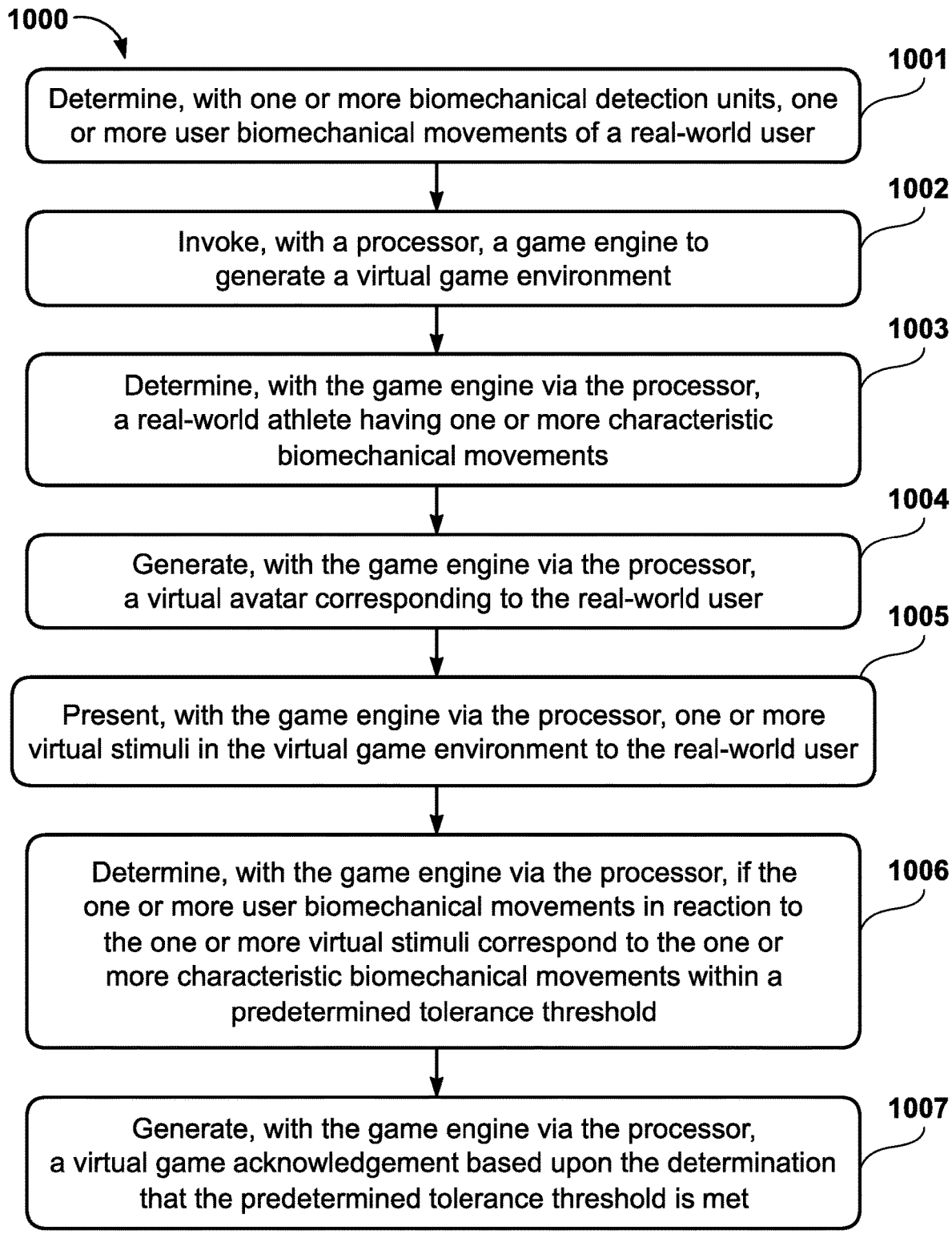
FIG. 10 illustrates a process that may be utilized to provide a game experience based on biomechanical assessments.

FIG. 10 illustrates a process 1000 that may be utilized to provide a game experience based on biomechanical assessments. At a process block 1001, the process 1000 determines, with one or more biomechanical detection units (e.g., sensors 103, image capture device 102, etc.), one or more user biomechanical movements of a real-world user 501. Further, at a process block 1002, the process 1000 invokes, with the processor 301, the game engine 104 to generate a virtual game environment. Additionally, at a process block 1003, the process 1000 determines, with the game engine 104 via the processor 301, a real-world athlete having one or more characteristic biomechanical movements. Also, at a process block 1004, the process 1000 generates, with the game engine 104 via the processor 301, a virtual avatar corresponding to the real-world user 501. At a process block 1005, the process 1000 presents, with the game engine 104 via the processor 301, one or more virtual stimuli in the virtual game environment to the real-world user 501. In addition, at a process block 1006, the process 1000 determines, with the game engine 104 via the processor 301, if the one or more user biomechanical movements in reaction to the one or more virtual stimuli correspond to the one or more characteristic biomechanical movements within a predetermined tolerance threshold. Moreover, at a process block 1007, the process 1000 generates, with the game engine 104 via the processor 301, a virtual game acknowledgement based upon the determination that the predetermined tolerance threshold is met.

A computer is intended herein to include any device that has a specialized processor as described above. For example, a computer may be a personal computer ("PC"), laptop computer, set top box, cell phone, smartphone, tablet device, smart wearable device, portable media player, video player, etc. The configurations provided for herein may be implemented in various forms of computers.

The illustrations provided for in the accompanying drawings that refer to basketball are provided only as examples. Other sports, athletic movements, or exercises may be utilized with any of the configurations provided for herein.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A system comprising:
    one or more large motor movement biomechanical detection units that detect one or more large motor biomechanical movements of a real-world user in a real-world environment, the large motor movement biomechanical detection units being positioned at a distance from the real-world user to capture the large motor biomechanical movements;
    one or more fine motor movement biomechanical detection units that detect one or more fine motor biomechanical movements of the real-world user in the real-world environment, the fine motor biomechanical detection units being positioned on the real-world user;
    an image capture device that captures one or more images of one or more physical attributes of the real-world user; and
    a processor that is programmed to invoke a game engine to generate a virtual game environment, perform an image analysis of the one or more images to select a real-world athlete that has physical attributes that match the one or more physical attributes of the real-world user, determine one or more characteristic biomechanical movements of the real-world athlete that the real-world athlete has performed external to the real-world environment and external to the virtual game environment, generate a virtual avatar corresponding to the real-world user, present one or more virtual stimuli in the virtual game environment to the virtual avatar, determine in real-time if the one or more large motor biomechanical movements and the one or more fine motor movements in reaction to the one or more virtual stimuli mimic the one or more characteristic biomechanical movements within a predetermined tolerance threshold, generate a virtual game acknowledgement based upon the determination that the predetermined tolerance threshold is met, and generate a virtual game recommendation based upon a determination that the predetermined tolerance threshold is not met, wherein the virtual game recommendation is for a real-world item to help the real-world user perform the one or more large motor biomechanical movements and the one or more fine motor biomechanical movements in reaction to the one or more virtual stimuli corresponding to the one or more characteristic biomechanical movements within the predetermined tolerance threshold.

2. The system of claim 1, wherein the one or more characteristic biomechanical movements correspond to an athletic movement.

3. The system of claim 1, wherein the one or more virtual stimuli correspond to one or more virtual cues from a virtual performance enhancement expert during a virtual training session in the virtual game environment.

4. The system of claim 1, wherein the one or more virtual stimuli correspond to one or more virtual movements from a virtual opponent during a virtual one-on-one game in the virtual game environment.

5. The system of claim 1, wherein the one or more virtual stimuli correspond to one or more virtual movements from one or more virtual opponents during a virtual multi-player game in the virtual game environment.

6. The system of claim 5, wherein the processor further generates the game acknowledgement based upon a communication criterion between the virtual avatar and a virtual avatar teammate participating in the virtual multi-player game.

7. The system of claim 1, wherein the virtual game acknowledgement is a virtual point increment.

8. The system of claim 1, wherein the virtual game acknowledgement is a virtual indication of a real-world item to be redeemed at a real-world store.

9. The system of claim 1, wherein the virtual game acknowledgement is a virtual indication of a real-world item to be redeemed at a virtual store.

10. A computer program product comprising a non-transitory computer readable medium having a computer readable program stored thereon, wherein the computer readable program when executed on a computer causes the computer to:
    determine, with one or more large motor movement biomechanical detection units, one or more large motor biomechanical movements of a real-world user in a real-world environment, the large motor movement biomechanical detection units being positioned at a distance from the real-world user to capture the large motor biomechanical movements;
    determine, with one or more fine motor movement biomechanical detection units, one or more fine motor biomechanical movements of the real-world user in the real-world environment, the fine motor biomechanical detection units being positioned on the real-world user;

capture, with an image capture device, one or more images of one or more physical attributes of the real-world user;

invoke, with a processor, a game engine to generate a virtual game environment;

perform an image analysis of the one or more images to select, with the game engine via the processor, a real-world athlete that has physical attributes that match the one or more physical attributes of the real-world user;

determine one or more characteristic biomechanical movements of the real-world athlete that the real-world athlete has performed external to the real-world environment and external to the virtual game environment;

generate, with the game engine via the processor, a virtual avatar corresponding to the real-world user;

present, with the game engine via the processor, one or more virtual stimuli in the virtual game environment to the virtual avatar;

determine, with the game engine via the processor in real-time, if the one or more large motor biomechanical movements and the one or more fine motor movements in reaction to the one or more virtual stimuli mimic to the one or more characteristic biomechanical movements within a predetermined tolerance threshold; and generate, with the game engine via the processor, a virtual game acknowledgement based upon the determination that the predetermined tolerance threshold is met.

11. The computer program product of claim 10, wherein the one or more characteristic biomechanical movements correspond to an athletic movement.

12. The computer program product of claim 10, wherein the one or more virtual stimuli correspond to one or more virtual cues from a virtual performance enhancement expert during a virtual training session in the virtual game environment.

13. The computer program product of claim 10, wherein the one or more virtual stimuli correspond to one or more virtual movements from a virtual opponent during a virtual one-on-one game in the virtual game environment.

14. The computer program product of claim 10, wherein the one or more virtual stimuli correspond to one or more virtual movements from one or more virtual opponents during a virtual multi-player game in the virtual game environment.

15. The computer program product of claim 14, wherein the computer is further caused to generate the game acknowledgement based upon a communication criterion between the virtual avatar and a virtual avatar teammate participating in the virtual multi-player game.

16. The computer program product of claim 10, wherein the virtual game acknowledgement is a virtual point increment.

17. The computer program product of claim 10, wherein the virtual game acknowledgement is a virtual indication of a real-world item to be redeemed at a real-world store.

18. The computer program product of claim 10, wherein the virtual game acknowledgement is a virtual indication of a real-world item to be redeemed at a virtual store.

* * * * *